UNITED STATES PATENT OFFICE.

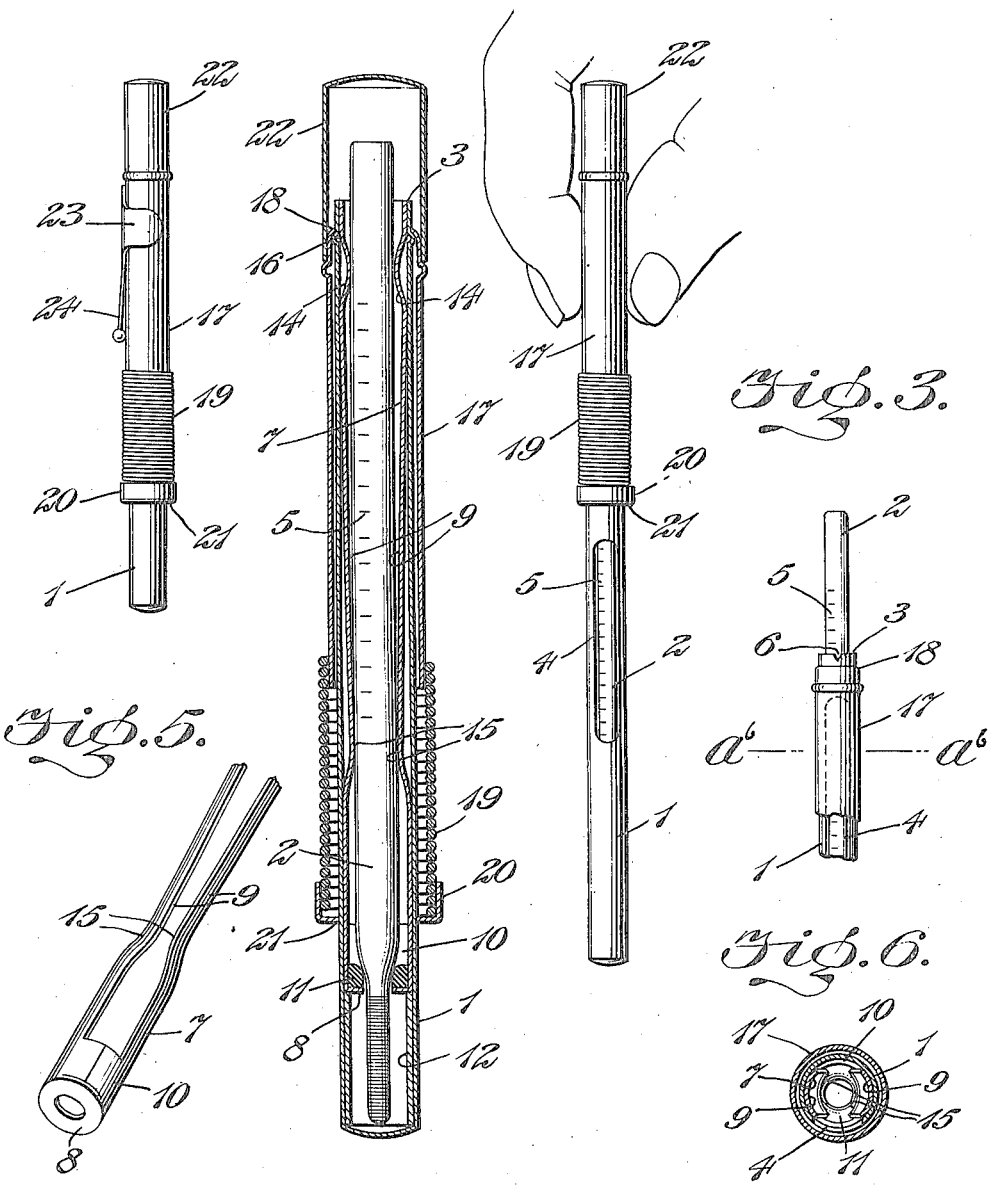

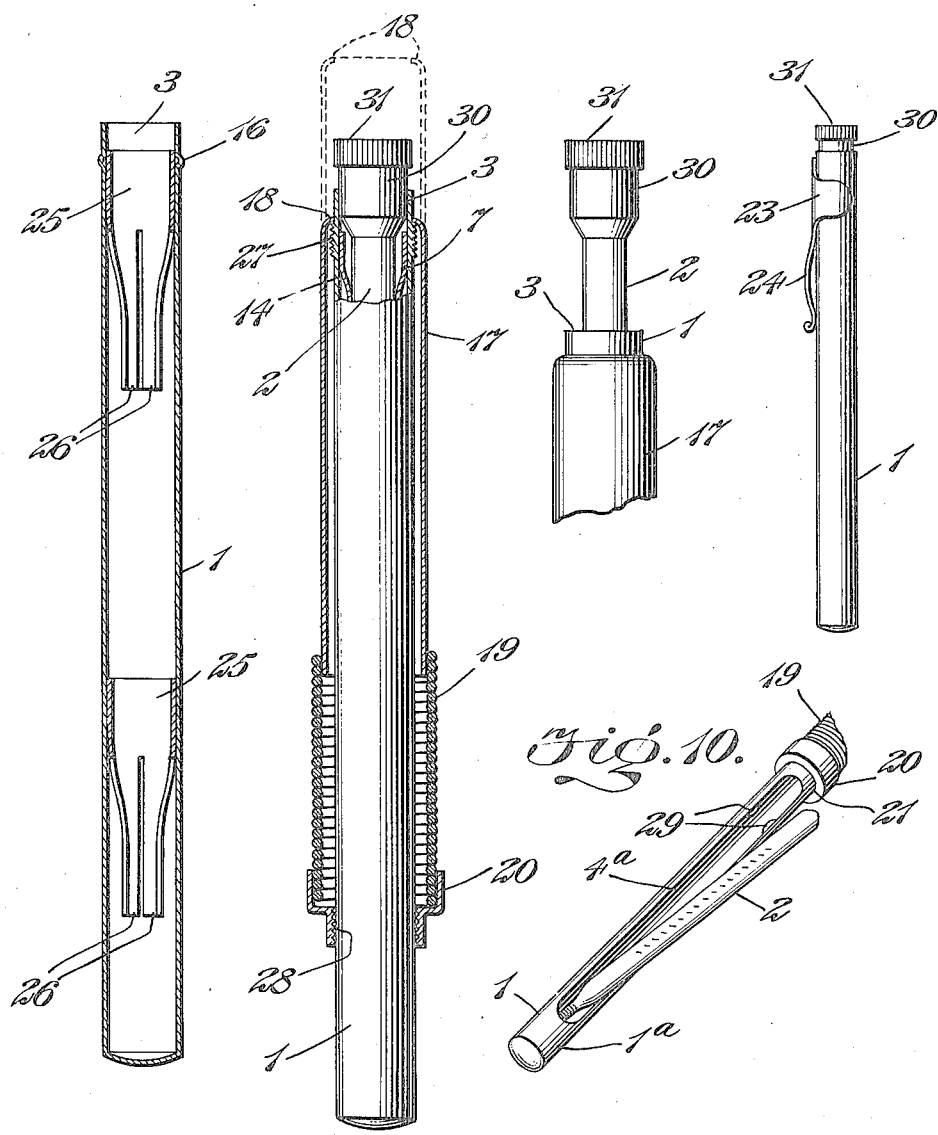

FAIRLEIGH S. DICKINSON, OF RUTHERFORD, NEW JERSEY.

THERMOMETER.

1,169,623.

Specification of Letters Patent.

Patented Jan. 25, 1916.

Application filed December 13, 1910. Serial No. 597,177.

*To all whom it may concern:*

Be it known that I, FAIRLEIGH S. DICKINSON, a citizen of the United States, and a resident of Rutherford, in the county of Bergen and State of New Jersey, have invented certain Improvements in Thermometers, of which the following is a specification.

This invention relates to certain improvements in clinical thermometers such as are ordinarily provided with pocket carrying cases or sheaths, and has for its object, in part to provide means of a comparatively simple and inexpensive nature and of a novel and improved construction whereby the mercurial column or thread of the thermometer may be quickly and conveniently shaken down or lowered without liability of breakage such as is liable to occur in such thermometers as ordinarily constructed, and in part, to improve and simplify the construction of the carrying case or sheath so as to lessen the liability of loss or misplacement of the parts thereof and to facilitate the introduction and removal of the thermometer therefrom.

The invention consists in certain novel features of the construction, and combinations and arrangements of the several parts of the improved clinical thermometer and of the protective carrying case therefor, whereby certain important advantages are attained, and the device is rendered simpler, less expensive and otherwise better adapted and more convenient for use, all as will be hereinafter fully set forth.

The novel features of the invention will be carefully defined in the claims.

In order that my improvements may be the better understood, I will now proceed to describe the same with reference to the accompanying drawings, wherein—

Figure 1 is an elevation illustrating one form of thermometer carrying case embodying my invention, the device being shown in closed condition; Fig. 2 is a view similar to Fig. 1, but illustrating the carrying case in extended condition, ready for shaking down the thermometer inclosed within it; Fig. 3 is a fragmentary view somewhat similar to Fig. 1, but showing the case opened for the withdrawal of the thermometer therefrom; Fig. 4 is an enlarged sectional view taken axially through the device as shown in Fig. 1, and illustrating certain features of construction to be hereinafter referred to; Fig. 5 is a perspective view showing the thermometer guiding and retaining means withdrawn from the case; Fig. 6 is a transverse section taken in the plane indicated by line $a^6$—$a^6$ in Fig. 3, illustrating certain features of construction to be hereinafter referred to; Fig. 7 is a fragmentary sectional view somewhat similar to Fig. 4, showing a modified formation of the guiding means in the case; Fig. 8 is a fragmentary sectional view somewhat similar to Fig. 4, but illustrating a modified formation of the device wherein the head of the thermometer tube operates as a closure for the carrying case; Fig. 9 is a fragmentary view somewhat similar to Fig. 8, but showing the thermometer tube partially withdrawn from the carrying case; Fig. 10 is a perspective view showing still another formation of the carrying case comprised in my present invention, and Fig. 11 is a side elevation showing another formation of the improved thermometer comprised within my present invention.

Referring first to Figs. 1 to 6, inclusive, the inclosing protective case or sheath for the thermometer, as therein shown is provided with an elongated tubular member or casing 1, of a diameter and length adapted for the reception of the thermometer tube 2 so that the latter may be housed and protected in order that it may be carried in the pocket without liability of breakage when not required for use. This tubular member or casing 1 is closed at its lower end, but open at its upper end, as shown at 3 for the convenient introduction and withdrawal of the thermometer tube, which latter, in the structure shown in Figs. 1 to 6, inclusive, is of such a length that its upper extremity protrudes slightly from the member 1 when in place therein, so that it may be readily grasped by the fingers for its removal. At a suitable point in the side wall of the tubular member or casing 1 is produced a sight aperture 4 so positioned and of such dimensions as to render the graduations 5 of the thermometer adjacent to the normal point of its scale visible therethrough when the thermometer is in place within the casing so that in the use of the thermometer one may know at a glance whether or not the mercurial column or thread stands below normal without the necessity of removing the thermometer from its protective casing. This affords great convenience in the use of the thermometer and for assuring correct positioning of the graduated scale 5 with reference to the sight aperture 4 I have shown the upper extremity of the tubular casing 1 provided with an indicating notch or device 6 in alinement with the sight aperture 4 so that when the thermometer is inserted in the case it may be readily positioned in such a manner that its graduated scale will be visible at said sight aperture. In connection with the tubular casing member 1 I have provided retaining means 7 for retaining the thermometer tube 2 in position within said member and preventing breakage of the tube due to accidental slipping of the same from the casing member and as shown in Figs. 1 to 6, such retaining means is in the form of a spring device formed of an integral piece of sheet metal having a circular member 8 centrally apertured for the passage of the bulb end of the thermometer tube and provided with oppositely facing spring arms 9, 9 said arms being so constructed adjacent to the member 8 as to produce a cylindrical socket 10 as clearly shown in Figs. 4 and 5 which is adapted to fit snugly within the lower end of the tubular casing member above a shoulder afforded by tube section 12 and is adapted to receive and retain a gasket 11 of soft rubber or the like affording a cushioned support for the lower extremity of the thermometer tube operating to hold the same in such position that its lower bulb end is retained out of contact with the closed lower extremity of the casing member. As shown in these views the spring arms 9, 9 are extended lengthwise within the tubular casing member 1 above the cylindrical part 10 and at opposite sides of the sight aperture 4 so as to be adapted to receive the thermometer tube between them when the same is inserted within the casing member and as shown in Figs. 4 and 5, the said spring arms are provided with inwardly bent cushion portions 14 and 15, the portions 14 being opposite to each other adjacent to the opened upper end of the casing member whereat the thermometer tube is inserted, so as to centrally position the same during its insertion in the casing member and the portions 15 being constructed and arranged in a corresponding manner adjacent to the cylindrical portion 10 so as to centrally position the lower end of the thermometer tube in alinement with the central opening of the member 8 during the introduction of the tube within the casing member 1. These cushion portions or members 14 and 15 not only facilitate the introduction of the thermometer tube within the casing member 1 but also operate by their resilient engagement therewith to hold said tube securely within the casing member when in place therein while permitting ready withdrawal of the thermometer tube from the casing member when desired for use and since the uppermost cushion portions or members 14 are adjacent to the open or mouth end of the casing member and are positioned at opposite sides of the part of said member whereat the sight aperture 4 is produced it will also be obvious that these portions or members 14 by engagement with the flattened surfaces commonly provided upon clinical thermometers in the production of the lenses thereof will operate to assist in alining the graduations 5 of the thermometer tube with the sight aperture during the introduction of the tube within the casing member. To facilitate the withdrawal of the tube from the casing in the construction shown in Figs. 1 to 6, the tube 2 is made of such length that when its bulb end is securely rested upon the cushion or gasket its upper extremity will protrude slightly from the open mouth end 3 of the casing member in position to be readily grasped between the fingers. Adjacent to its open mouth end 3 the casing member is provided with an outwardly swaged portion 16 affording an annular flange around the same and upon said casing member is mounted a shaking attachment operable for use in shaking down the mercurial column or thread of the thermometer tube while the latter is inclosed and housed within the casing member and without requiring its removal therefrom, thereby affording efficient protection against breakage of the thermometer such as is liable to occur where the thermometer is shaken down after removal from the carrying case and in the construction shown in Figs. 1 to 6, the shaking attachment is in the form of a tubular or sleeve like member arranged to slide telescopically upon the casing member 1 and so constructed and arranged when slid in one direction over said casing member as to afford a closure or cover for the sight aperture 4 as indicated in Fig. 1, and also when the slip cap or closure 22 is not in applied position, to expose the upper open end or mouth 3 of the casing member for the convenient withdrawal of the thermometer tube from same and when adjusted to another position as shown in Fig. 2, said sleeve like attachment is adapted to project beyond the open mouth end of the casing member so as to afford an extension therewith adapted to be grasped between the fingers for use in shaking the inclosed thermometer for the return of its mercurial thread or column to a lowered position. In the construction herein shown the sleeve like attachment comprises an upper tubular part 17 inwardly swaged at its upper end as shown at 18 for the production of a stop engageable with the circumferential shoulder 16 of the casing member when the attachment is slid downwardly over the sight aperture thereof as shown in Fig. 4 and a lower member or collar 20 having an inturned portion 21 similarly adapted for engagement with said shoulder 16 with the casing member to stop movement of the attachment thereupon when the attachment is adjusted to its opposite position and projects beyond the upper mouth end of the casing member as indicated in Fig. 2, the parts or members 17 and 20 being connected with each other by a resilient portion or section 19 herein shown as formed from a helically coiled wire, the opposite ends whereof are rigidly secured by solder or in any other suitable manner to said members 17 and 20 and which is so constructed and arranged as to permit vibratory movement of the casing member containing the thermometer such as is calculated to shake down the mercurial thread or column when the attachment is extended beyond the mouth end of the casing member in position to be grasped by the hand as indicated in Fig. 2. The upper extremity of the attachment is open as indicated in Fig. 3 to facilitate the withdrawal of the thermometer tube from the inclosed casing member 1 and is provided with a detachable slip cap or closure 22 which is adapted to be fitted securely upon its said open upper end to cover the protruding extremity of the thermometer tube when the device is not in use. 23 represents a clip applied upon the upper part of the attachment and having a spring tongue 24 engageable over the edge of the pocket when the carrying case is inserted therein so as to securely hold the device within the pocket. The engagement of this tongue with the edge of the pocket as specified, it effectively retains the attachment in the compacted position upon the casing member illustrated in Fig. 1 so that there is no liability of the attachment protruding so far from the pocket as to fall therefrom.

From the above description it will be seen that the improved thermometer and protective casing therefor constructed according to my invention are of extremely simple and comparatively inexpensive nature, and are particularly well adapted for use, and it will also be obvious from the above description that the device embodying my improvements is susceptible of considerable change without material departure from the principles and spirit of the invention and for this reason I do not desire to be understood as limiting myself to the precise formation and arrangement of the several parts herein set forth in carrying out my invention in practice. For example, in Fig. 7 I have shown a variation of the retaining means for holding the thermometer within the casing member comprising short tube sections 25, 25 secured within the upper and lower ends of the casing member and provided with spring tongues 26 adapted for resilient engagement with the thermometer tube to centrally position the same within the casing member, and in Fig. 8 I have shown the upper extremity of the thermometer tube 2 provided with an enlargement 30 capable of use as a handle and of a diameter to fit snugly within the upper open end 3 of the casing member so as to operate to retain the thermometer against accidental displacement when inserted in said casing member. In this form of the device the enlargement 30 has a milled part 31 to facilitate grasping the same between the fingers and is of such diameter as to permit the sleeve like shaking attachment to slide upwardly over it as shown in dotted lines on the drawing. Where the enlargment 30 is provided as shown in Figs. 8 and 9, the slip cap 22 may be omitted and if desired, the upper cushion portions or members 14 may be dispensed with. In the construction shown in Fig. 8, the shaking attachment is also detachably connected with the casing member 1, the stops 16 and 21 of the construction shown in Figs. 1 to 6 being replaced by reciprocal screw threads 27 and 28 which operate as stops during the normal use of the device to permit the shaking attachment to be unscrewed from the casing member when adjusted to the extended position indicated in Fig. 2.

In Fig. 10 I have shown another form of the device wherein the sight aperture 4$^a$ of the casing member is of such length as to permit the introduction of the thermometer tube within said casing member from a lateral direction, the lower extremity of the casing member having a socket 1$^a$ wherein the bulb end of the thermometer is received and its upper end being provided with resilient parts 29 at opposite sides of the sight aperture 4$^a$ capable of engagement with the thermometer tube to retain the same in position.

In Fig. 11 I have shown still another formation of the device comprised in my present invention wherein the shaking attachment is omitted from the casing member 1 which is open at its upper end for the reception of the enlargement 30 of the thermometer tube so that the said enlargement operates as a closure for the casing member and at the same time retains the thermometer tube in position against accidental withdrawal from the carrying case.

Having thus described my invention, what I claim and desire to secure by Letters Patent is—

1. The combination of a carrying case made in tubular form and adapted for the reception of a clinical thermometer or the like, and a resilient shaking attachment slidable on the case and operable for use in shaking the same for lowering the mercurial column of the inclosed thermometer when extended beyond the mouth end of the casing member in position to be grasped by the hand, the attachment being prevented from separating from the case by its end abutting against a stop near the end of the case.

2. A device of the character described comprising a carrying-case open at one end, a thermometer in said case provided with a head forming a closure for the latter, a yielding support for said thermometer operating to center it in the case, and a resilient sleeve slidable along the case beyond the thermometer's head therein, whereby said sleeve is enabled to be used as a flexible handle to shake the thermometer while it rests yieldingly supported in the case.

3. A device of the character described comprising a clinical thermometer, a carrying-case therefor open at one end to receive the same, said thermometer being provided with a handle constituting a closure for the case, and a three-part shaking attachment carried by the case and slidable thereon past said closure, said attachment including a socket adapted to limit the movement of the case at the time the shaking attachment reaches an extended position on the said case, an outwardly slidable handle member to be grasped by the hand, and a flexible wire-coil connecting said socket and said handle member.

4. A device of the character described comprising a clinical thermometer, a carrying-case open at one end to receive said thermometer and having a lateral aperture through which the thermometer's graduations may be viewed, the thermometer being provided with a head forming a closure for said open end of the case by frictional engagement therewith, and an intermediately-resilient sleeve normally covering said aperture and slidable along the case over the thermometer's head, whereby the sleeve becomes adapted for use as a flexible handle to shake the thermometer while it rests in the case, with its graduations exposed to view.

5. In a device of the character described, a tubular case closed at one end open at the other end, a thermometer having a bulb at one end and an integral handle on the other end, the said handle being adapted to be slipped into and seated in the said open end of the case to form a closure for the same, a sleeve having a limited sliding motion on the said case toward the closed end and adapted to be moved beyond the open end and the said thermometer handle seated therein, a socket having a limited sliding motion on the said case in the direction of the open end thereof, and a flexible connection attached at its ends to the said sleeve and the said socket.

In witness whereof I have hereunto signed my name this 12th day of Dec. 1910, in the presence of two subscribing witnesses.

FAIRLEIGH S. DICKINSON.

Witnesses:
J. D. CAPLINGER,
W. E. LAWSON.